United States Patent
Rao (10) Patent No.: US 11,276,046 B2
(45) Date of Patent: Mar. 15, 2022

(54) SYSTEM FOR INSIGHTS ON FACTORS INFLUENCING PAYMENT

(71) Applicant: Dell Products L.P., Round Rock, TX (US)

(72) Inventor: Venkata Chandra Sekar Rao, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 16/161,278

(22) Filed: Oct. 16, 2018

(65) Prior Publication Data
US 2020/0118100 A1 Apr. 16, 2020

(51) Int. Cl.
*G06Q 20/10* (2012.01)
*G06Q 40/02* (2012.01)
*G06N 20/00* (2019.01)
*G06N 3/04* (2006.01)

(52) U.S. Cl.
CPC ............ *G06Q 20/102* (2013.01); *G06N 3/04* (2013.01); *G06N 20/00* (2019.01); *G06Q 40/025* (2013.01)

(58) Field of Classification Search
None
See application file for complete search history.

(56) References Cited

U.S. PATENT DOCUMENTS

| | | | | |
|---|---|---|---|---|
| 8,396,789 B1* | 3/2013 | Sudjianto | ............ | G06Q 40/025 705/38 |
| 2002/0161731 A1* | 10/2002 | Tayebnejad | ............ | G06Q 40/08 706/20 |
| 2002/0165808 A1* | 11/2002 | Zamsky | ............... | G06Q 20/403 705/35 |
| 2005/0222806 A1* | 10/2005 | Golobrodsky | ...... | H04L 63/1416 702/179 |
| 2010/0106582 A1* | 4/2010 | Etheredge | ............... | G06Q 40/02 705/14.17 |
| 2014/0046828 A1* | 2/2014 | Rivet | ..................... | G06Q 40/02 705/38 |
| 2015/0161741 A1* | 6/2015 | Unser | .................... | G06Q 40/12 705/30 |
| 2016/0124989 A1* | 5/2016 | Kumar | .................. | G06F 16/258 707/690 |

(Continued)

OTHER PUBLICATIONS

Steenson, Machine Learning in the Payments Industry, Visa (Year: 2018).*

(Continued)

*Primary Examiner* — David P Sharvin
*Assistant Examiner* — Brock E Turk
(74) *Attorney, Agent, or Firm* — Terrile, Cannatti & Chambers, LLP; Emmanuel A. Rivera (57) ABSTRACT

A system, method, and computer-readable medium for performing a payment tracking operation. Factors, that include input, features and attributes of various customers are received and processed. The processing includes imputing, deleting and converting the factors for further refinement for machine learning. The machine learning processes the factors using succeeding layers that include random forest to categorize customers, multivariate regression to determine which factors have the greatest effects on payment. In addition, a recurrent neural network approach is used to further refine the factors and provide a more accurate analysis.

16 Claims, 10 Drawing Sheets

(56) References Cited

U.S. PATENT DOCUMENTS

| | | | |
|---|---|---|---|
| 2016/0260113 A1* | 9/2016 | Simpson | G06Q 30/0204 |
| 2017/0004469 A1* | 1/2017 | Cassel | G06Q 20/14 |
| 2018/0204281 A1* | 7/2018 | Painter | G06Q 20/4037 |
| 2018/0308023 A1* | 10/2018 | Bansal | G06N 3/02 |
| 2018/0357714 A1* | 12/2018 | So | G06N 20/00 |
| 2019/0019202 A1* | 1/2019 | Takamatsu | G06Q 30/02 |

OTHER PUBLICATIONS

Green E., Deep learning applied to consumer transactions with Think Big Analytics, Put AI to Work conference, 2017, pp. 2-21 (Year: 2017).*

Bacham et al, Machine Learning: Challenges, Lessons, and Opportunities in Credit Risk Modeling, moody's analytics risk perspectives | managing disruption, vol. IX, Jul. 2017, pp. 1-10 (Year: 2017).*

Addo et al, Credit Risk Analysis Using Machine and Deep Learning Models, risks, Apr. 9, 2018, pp. 1-18 (Year: 2018).*

Nanda, Sonali. "Proactive Collections Management: Using Artificial Intelligence to Predict Invoice Payment Dates." Credit Research Foundation Q 1: 2018 (Year: 2018).*

Fico, Boost Collections and Recovery Results with Analytics, No. 31, Feb. 2010.

Optio Solutions, LLC, How to Increase Debt Collection ROI 20-30% During Tax Season, Jan. 30, 2017.

\* cited by examiner

| Class Label | Risk Class | customer_type | No of Invoices paid on time |
|---|---|---|---|
| Promising customers | HI, HLD, EXL | Good | 70%-75% |
| Hi Defaulters | LOW,MED | Bad | <=30% |
| Good customers | NEW | Good | 75%-90% |
| Repeat Defaulters | HI, HLD, EXL | Bad | 30%-70% after risk upgraded |
| Early pay | LOW,MED | Good | >90% |
| New Defaulters | NEW | Bad | <100 Invoices & <40% |

SYSTEM FOR INSIGHTS ON FACTORS INFLUENCING PAYMENT

BACKGROUND OF THE INVENTION

Field of the Invention

The present invention relates to payment management systems. More specifically, embodiments of the invention relate to identifying factors affecting payment of goods and/or services.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Businesses provide and sell various goods and services to different customers. Typically payment for such goods and services is made by customers after such goods and services are provided. It is vital for businesses to keep track of payment for particular goods and services. Tracking of payment becomes more difficult, as goods and services become more varied, as the number of customers expand, and business organizational structures grow and become more complicated. Businesses seek to determine what affects payment from customers and find effective solutions to receive payments. An option available to businesses are customer risk assessment systems. A customer risk system generally processes, compiles, stores, and/or communicates information or data related to specific customers, ranks customers as to risk and timely payment. Because there can be many factors, internal and external to businesses that affect payment, customer risk assessment systems may not accurately determine and analyze payment and risk issues. Customer risk assessment systems may include a variety of hardware and software components that may be configured to process, store, and communicate information and may include one or more computer systems, data storage systems, and networking systems.

SUMMARY OF THE INVENTION

A system, method, and computer-readable medium are disclosed for payment tracking operation. The operation includes receiving multiple factors, such as inputs, features and attributes of customer that have past and current payment records. The factors are processed by imputing, correcting, and converting the factors for machine learning. The machine learning makes use of successive layers to provide analysis as to customer segmentation and expected payment cycles/days as to the multiple factors. The layers include multivariate liner regression of the inputs, features and attributes; determining intersection between payment rules and customer segmentation; and recurrent neural network processing to predict customer risk profile and payment date.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing a payment tracking operation. In certain embodiments, the payment tracking operation analyzes several factors (inputs, features and attributes), including internal factors that can be influenced, to manage payments, such as pays due accounts. In certain embodiments, the payment tracking operation provides insight as to which type of orders, how to ship on which route, checklist for collectors/sales reps, how customer payment trend is changing, expected payment date for the new invoice creations, etc. In certain embodiments, the payment tracking operation applies a machine learning model to recommend factors to change or modify to improve payment metrics.

Delays in payment can influence cash flow greatly affect a business/company. Delays in payment can be attributable to several factors, including external and internal factors in a business/company. Certain factors can be influenced by a business/company, such as internal factors to the business/company. For example, internal factor can include International commercial terms for transporting, which may be correlated directly with the order type, product, shipping type and route; delay in sending Invoices to the customers due to collector confirmation, tax (e.g., valued added tax) issues, order pending approval; and invoice amount correlated to the customer risk class, e.g. low payment amount invoices collection is always getting delayed from low/ medium risk category of customer.

In certain embodiments, the payment tracking operation analyzes historical transactions and determines correlation between internal factors and attributes influencing in payment. Furthermore, the payment tracking operation provides insights on which type of orders, how to ship on which route, checklist for collectors/sales representatives, how customer payment trend is changing, expected payment date for the new invoice creations, etc. More specifically, insight is determined regarding characterization of customers and their probability of payment. Prediction as to which delinquent accounts will self-cure. Provide understanding as to which customers are unlikely to pay no matter how much time and resources are invested. In addition, the payment tracking operation provides portfolio management and expected payment date for the new invoices.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
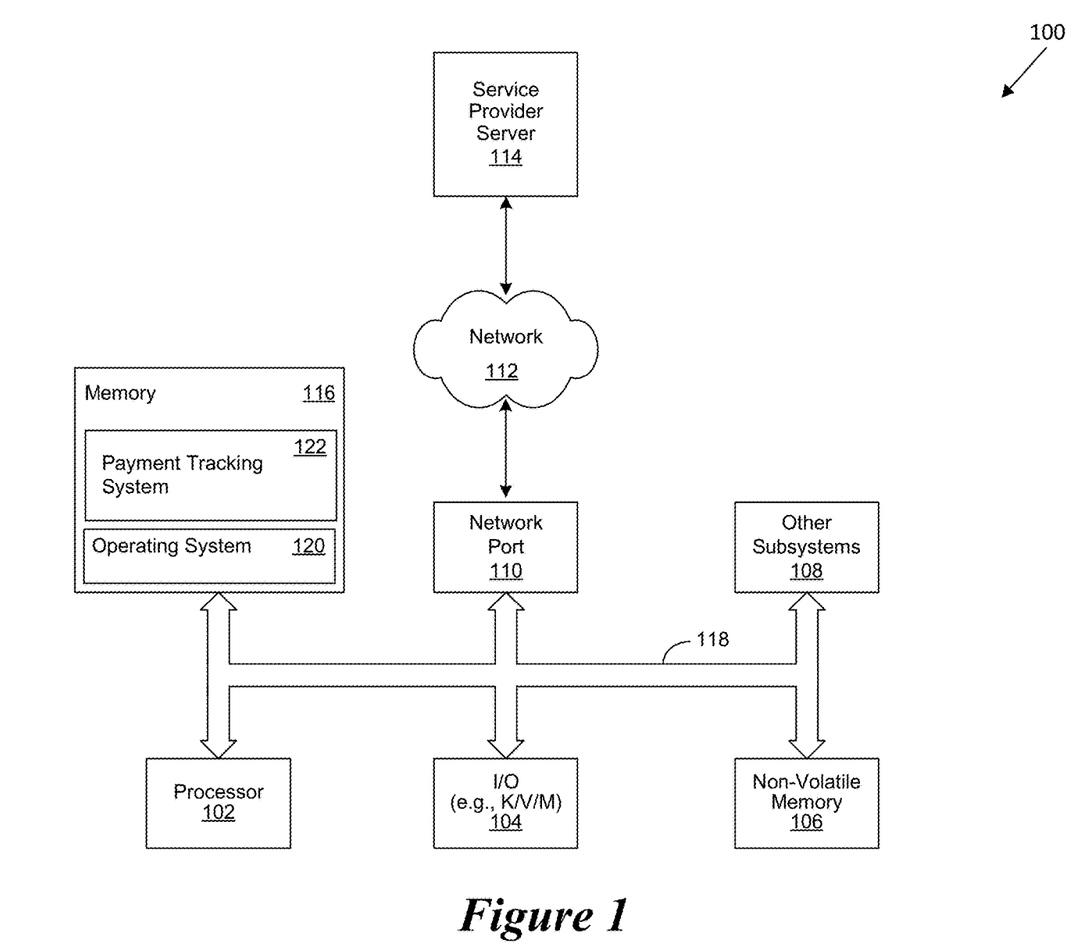
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 112, which is likewise accessible by a service provider (business/company) server 114. The information handling system 100 likewise includes system memory 116, which is interconnected to the foregoing via one or more buses 118. System memory 116 further comprises operating system (OS) 120 and in various embodiments comprise payment tracking system 122.

In certain embodiments, the payment tracking operation can improve payment increases by 42% during operation of an information handling system. As will be appreciated, once the information handling system 100 is configured to perform the payment tracking operation, the information handling system 100 becomes a specialized computing device specifically configured to perform the payment tracking operation and is not a general purpose computing device.

Figure 2:
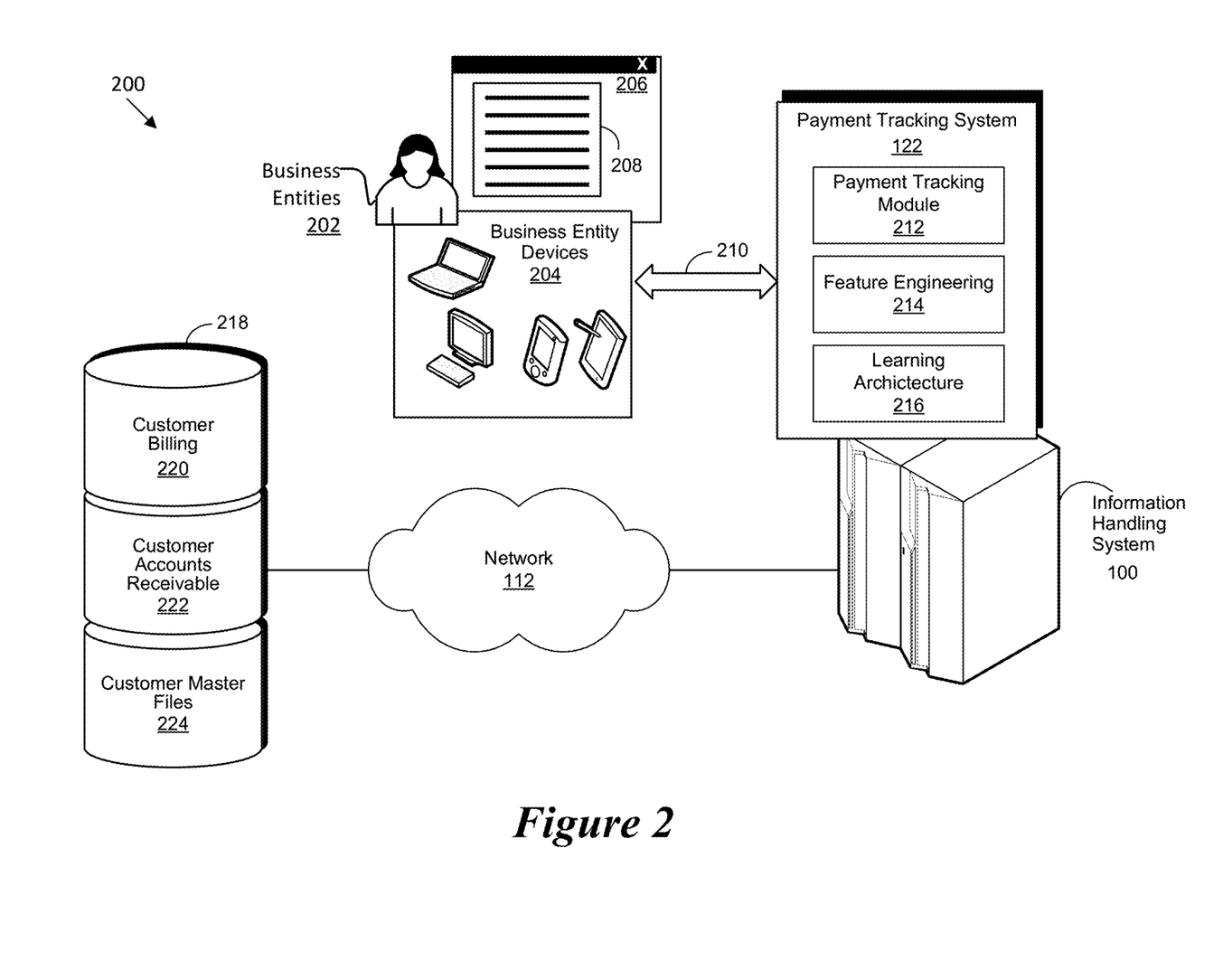
FIG. 2 is a block diagram of a payment tracking system.

FIG. 2 is a payment tracking environment 200 as implemented in accordance with an embodiment of the invention. The payment tracking environment 200 includes a payment tracking system 122. The payment tracking system 122 interacts with business entities 202. Business entities 202 can include account managers, sales representatives, service managers, product managers, shipping personnel, and any other entity in a company or business that has an interest in payment from customers.

In various embodiments, a business entity 202 generates a payment tracking analyst request which is provided to the payment tracking system 122. In various embodiments, a payment tracking system 122 executes on a hardware processor of information handling system 100. In various embodiments, the business entity 202 may use a business entity devices 204 to interact with the payment tracking system 204.

As used herein, a business entity devices 204 refers to an information handling system such as a personal computer, a laptop computer, a tablet computer, a personal digital assistant (PDA), a smart phone, a mobile telephone, or other device that is capable of communicating and processing data. In various embodiments, business entity devices 204 provide a payment tracking user interface 206 that presents a graphical representation 208 of payment tracking information which are automatically generated in response to interaction with the payment tracking system 122.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

In certain embodiments, payment tracking system user interface 206 may be presented via a website. In various embodiments, the business entity devices 204 are used to exchange information between the business entities 202 and the payment tracking payment tracking system 122 through the use of a communication channel 210. In certain embodiments, the communication channel 210 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the payment tracking payment tracking system 122 includes a payment tracking module 212 which performs a payment tracking payment tracking operation. The tracking system 122 includes a feature engineering module 214 which interacts with the payment tracking payment tracking module 212 when performing the payment tracking operation. The tracking system 122 also includes a marching learning engine or learning architecture 216 which interacts the feature engineering module 214, as further described below.

In various embodiments, the payment tracking environment 200 includes input data 218. The input data 218 may be local to the system executing the payment tracking payment tracking system 122 or may be executed remotely. In various embodiments, the input data 218 includes customer billing 220, customer accounts receivable 222 and customer files 224, as further described below. In certain embodiments, input data 218 is internal to a company or business.

In certain implementations, input data 218 is connected by network 112 to information handling system 100. In certain embodiments, the network 112 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

Figure 3:
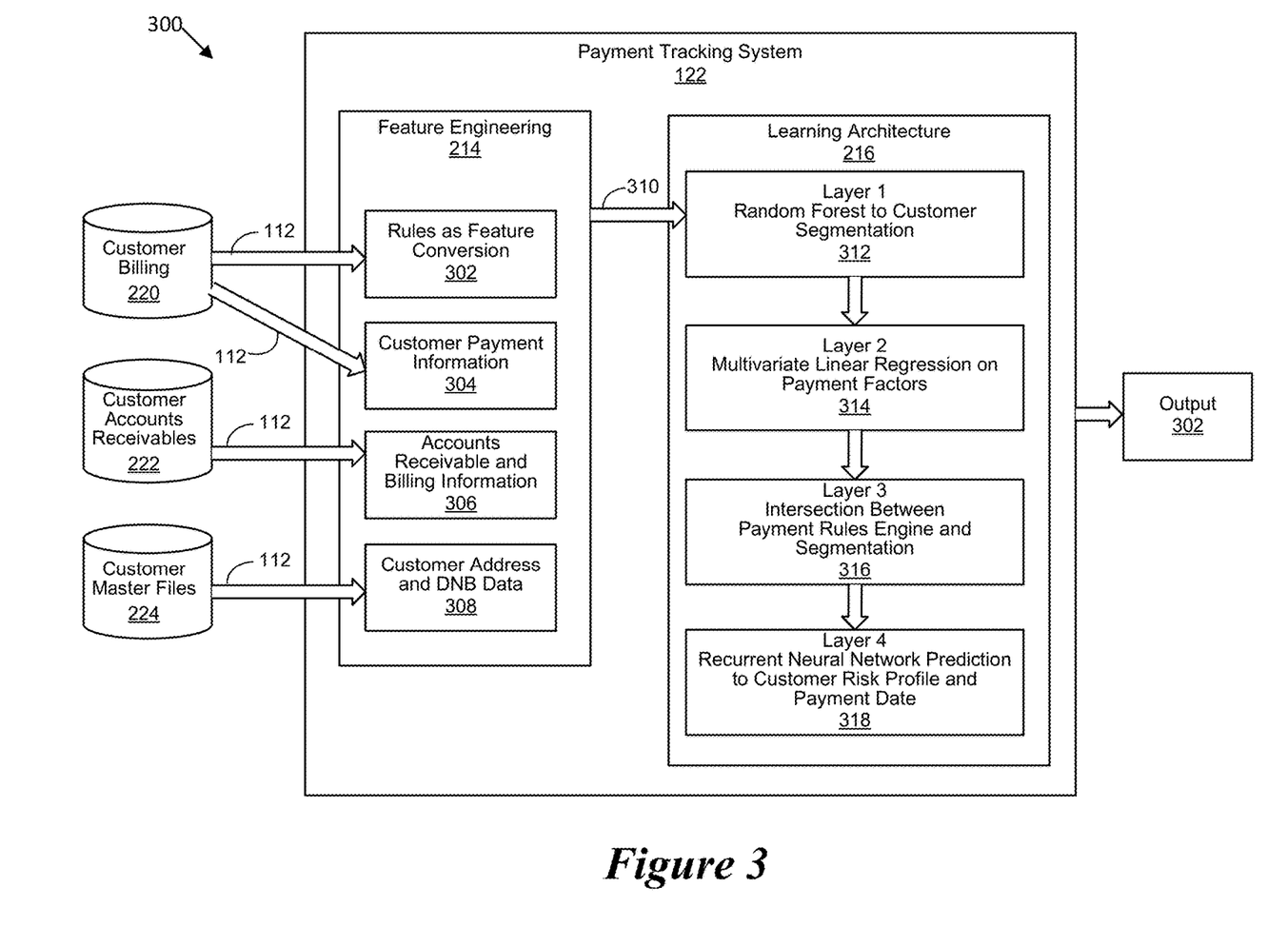
FIG. 3 is a functional block diagram of a payment tracking environment.

Referring to FIG. 3 a functional block diagram of a payment tracking environment 300 when performing a payment tracking operation is shown. In certain embodiments, payment tracking environment 300 is included with payment tracking environment 200. As discussed above, for various embodiments, the tracking system 122 receives data from input data 218, and particular from repositories customer billing 220 customer accounts receivables 222, and customer master files 224. In certain implementations, connection is by network 112.

For certain embodiments, input is provided to feature engineering module 214. Feature engineering module 214 receives the input and processes the input. For example, feature engineering module 214 can impute missing or desired values of inputs, features and attributes, remove outlier values that are not needed, and convert input values such as from numerical to categorical. In addition, certain logic can be applied by feature engineering module 214. Examples of such logic include: days to pay (due date–invoice date), payment days (clearing date–due date), amount category (e.g., if accounts receivable amount is less than $20K, the "low" else "high").

Inputs, features and attributes from repositories or databases such as customer billing 220 customer accounts receivables 222, and customer master files 224, as received by feature engineering module 214 can include, for example, the following, inputs, features and attributes: invoice number; document date; accounts receivable and logistics data attributes (e.g., contains both closed & open invoices which are available in SAP and incremental load daily per each and every account receivable document that other attributes are pulled from); customer details like customer number, name, etc.; customer risk class; terms of payment (e.g., payment term for 30 days, 45 days, 60 days, etc.); order number; invoice number; item family name; item product type; document date; due date; clearing date; accounts receivable amount; bill location address/city/country; shipping type like Air, truck, ground, etc.; order type like standard, maintenance, etc.; route which is connection between shipping points; sales representative; accounts receivable issues (e.g., missing back up document); international commerce or Inco terms; confirmation issues; rejection issues (e.g., warranty return); etc. It is to be understood that this is not an exhaustive list, but includes examples of inputs, features and attributes that can be used in determining payment tracking operations. Other inputs, features and attributes, can be implemented.

In certain embodiments, to perform certain operations, the feature engineering module 214 includes other modules, such as rules as feature conversion 302, customer payment information 304, accounts receivable and billing information 306, and customer address and DNB (Dunn & Bradstreet) data 308. The modules rules as feature conversion 302, customer payment information 304, accounts receivable and billing information 306, and customer address and DNB data 308 process and impute data for further processing by payment tracking system 122.

For certain implementations, rules as feature conversion 302 receives input from customer billing 220; customer payment information 304 receives input from customer billing 220; accounts receivable and billing information 306 receives input from customer accounts receivables 222; and customer address and DNB data 308 receives input from customer master files 224.

In certain embodiments, the marching learning engine or learning architecture 216 receives processed inputs, features and attributes from feature engineering 214, as represented by 310. Learning architecture 216 applies a machine learning model to recommend factors to change or modify to improve payment metrics. In certain implementations, the inputs, features and attributes are processed through various layers to further refine and determine which inputs, features and attributes can be modified to improve payment metrics. For example, payment metrics can include improving payment cycles and determining when payment is made.

In certain embodiments, learning architecture 216 includes four successive layers. Layer 1 is random forest to customer segmentation 312. Layer 2 is multivariate linear regression on payment factors (inputs, features and attributes) 314. Layer 3 is intersection between payment rules engine and segmentation 316. Layer 4 is recurrent neural network prediction to customer risk profile and payment date 318.

Furthermore, an output 320 is provided is provided to business entities 202 and other users from payment tracking system 122. The output 320 can include various payment tracking information and analysis as processed by the payment tracking system 122.

Figure 4:
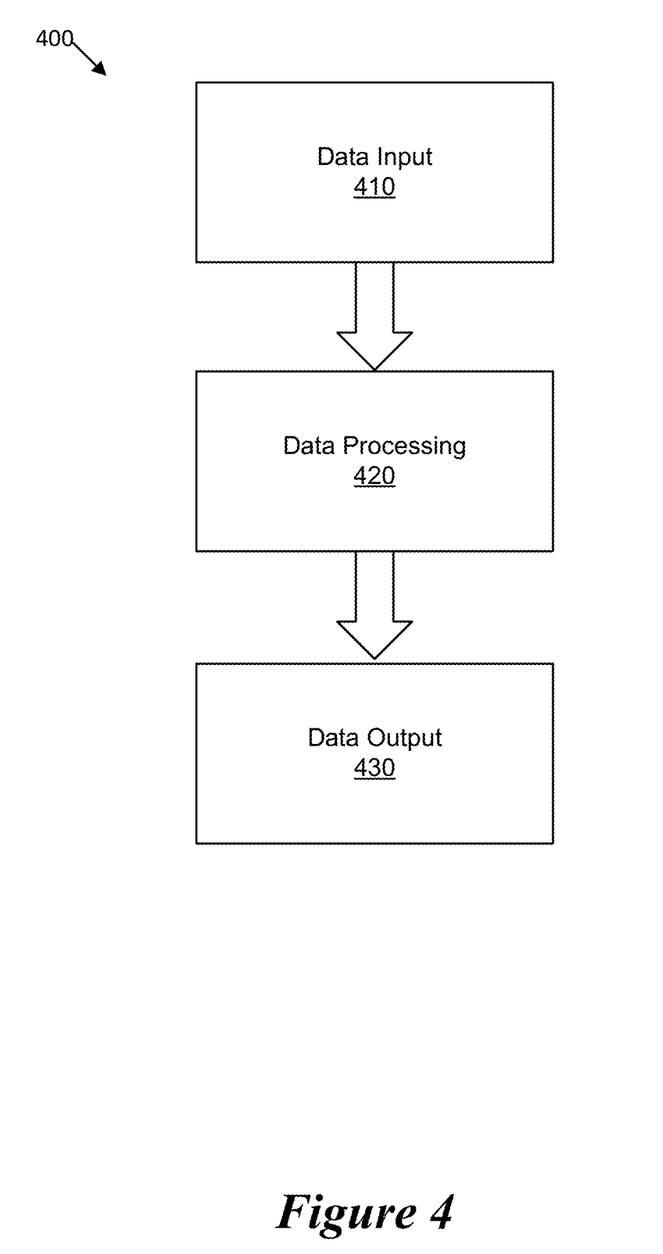
FIG. 4 is a block diagram of a data model of a payment tracking system.

Referring to FIG. 4, a block diagram of a data model 400 of a payment tracking system is shown. More specifically, the data model 400 includes a data input portion 410, a data processing portion 420 and a data output portion 430. The data input portion 410 receives inputs, such as factors, data inputs, attributes and features as discussed above. The data processing portion 420 includes processing of factors such as inputs, attributes and features as discussed above. The data output portion 430 provides analysis and information as to payment tracking, customer risk assessment, trend analysis, etc. In certain embodiments and implementations, the data output portion 430 includes various user interfaces.

Referring back to FIG. 3, the learning architecture 216 includes layer 1, random forest to customer segmentation 312. In certain implementations, factors are received by random forest to customer segmentation 312 to classify customers. For example, classification can include promising customers, high defaulters, good customers, repeat defaulters, early payers, and new defaulters. A random forest calculation is implemented.

Figure 5:
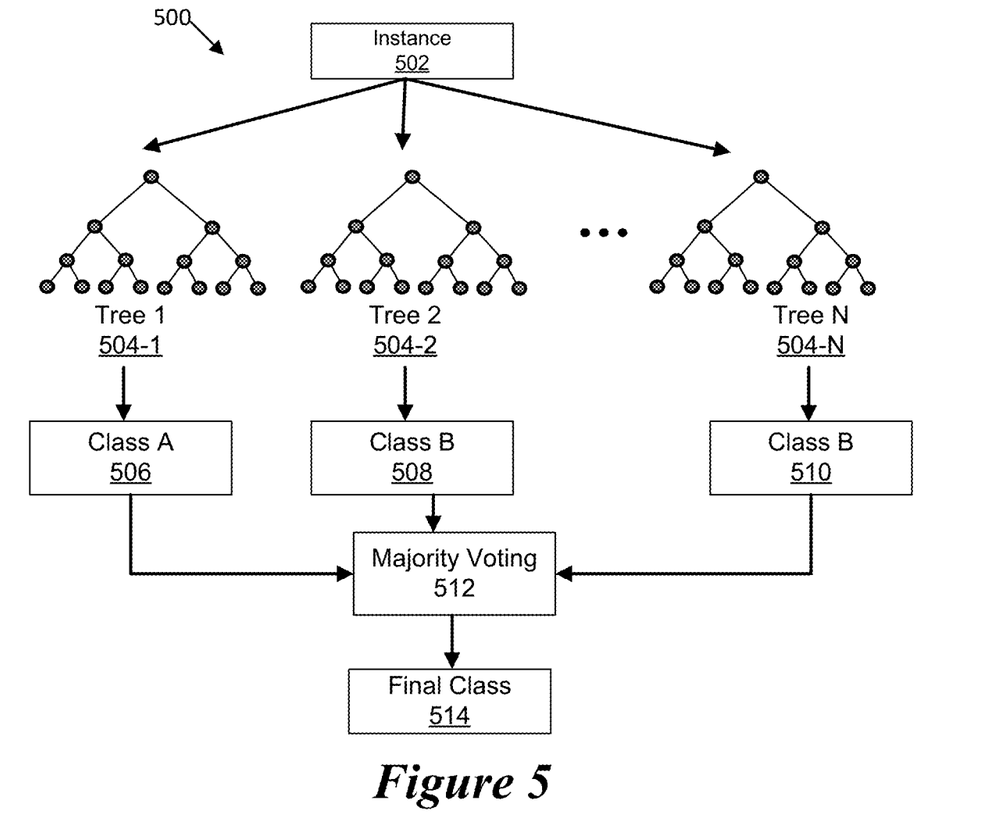
FIG. 5 is a random forest architecture.

Referring now to FIG. 5 a random forest architecture 500 is shown. The architecture has a top node instance 502. From the node 502, trees 504-1 to 504-N are branched out. The trees 504 are decision trees that are part of the random forest architecture 500. The trees 504 can be built from the features related to instance 502. From trees 504, classes 506, 508 and 510 are determined. In this example, class 506 is class A, while classes 508 an 510 are class B. Majority voting 512 can be performed based on the input from the classes (i.e., classes 506, 508 and 510). In certain embodiments, a further refinement can be made at final class 514.

Figure 6:
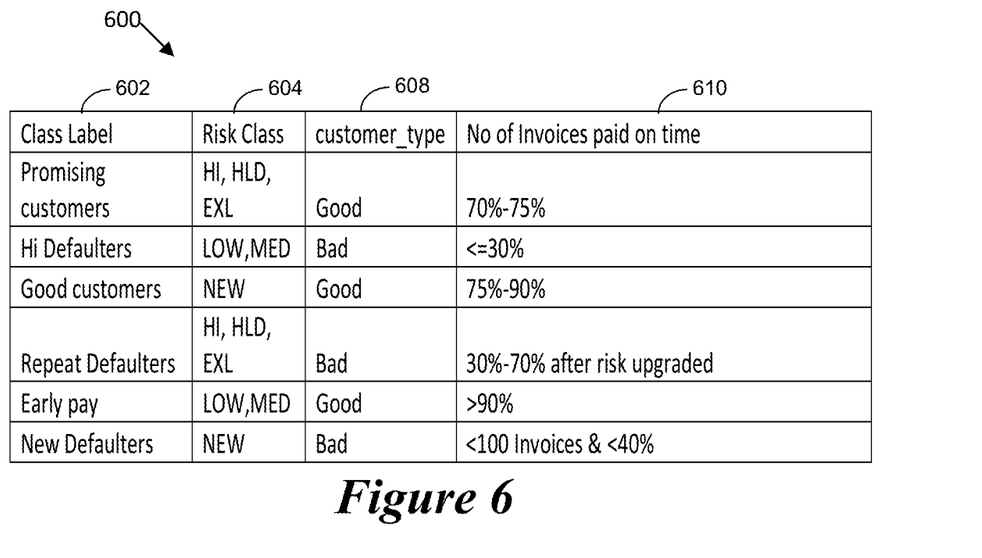
FIG. 6 is a customer classification table.

An example pseudo code for a random forest calculation is the following:
a) Randomly select "K" features from total "m" features where k«m
b) Among the "K" features, calculate the node "d" using the best split point
c) Split the node into daughter nodes using the best split
d) Repeat the a to c steps until "1" number of nodes has been reached
e) Build forest by repeating steps a to d for "n" number times to create "n" number of trees Referring to FIG. 6, an example table 600 is shown. Table 600 includes the defined classes of customers. In particular, headings designated customers. In this example, the headings include class label 602, risk class 220, customer type, and number of invoices paid. In certain embodiments, after performing layer 1 random forest to customer segmentation 312, customers can be categorized/placed in table 600.

Referring back to FIG. 3, learning architecture 216 includes layer 2, multivariate linear regression on payment factors 314, which further processes/refines the factors (inputs, features and attributes) from layer 1, random forest to customer segmentation 312. In certain implementations, after customers are segmented/classified in layer 1 random forest to customer segmentation 312, multiple internal factors can be collected are correlated in receiving payment. Examples of such factors include shipment type, shipment location, shipment method/route, sales channel, credit risk, invoice product type, sales representative, product family, accounts receivable issues, Inco term (i.e., commercial terms), etc.

Each factor (inputs, features and attributes) has particular variables that define value of the factor. For example, the factor "shipment method/route" can be "air", "ground", etc. For multivariate linear regression, a determination is made as to contribution of the values of particular features. In particular, a determination is made as to contribution of particular feature values as to payment. An example of such a calculation of "X" which correlates to "Y" is $$X=a*\{\text{variable of factor 1}\}+b*\{\text{variable of factor 1}\}+\ldots+n*(\text{variable of feature } N)$$

$$Y=\text{Payment Days}$$

A determination is made as to the values of the coefficients a, b ... n, as to which value(s) contribute more or have a greater affect as to payment.

Learning architecture 216 includes layer 3, intersection between payment rules engine and segmentation 316, which further processes/refines the factors (inputs, features and attributes) from layer 2, multivariate linear regression on payment factors 314. In particular, when the coefficients a, b ... n are determined the following is determined:
+ye coefficient directly proportionate to the property
−ye coefficient indirectly proportionate to the property For example, if customer payment is classified as good: a +ve slope against any attribute increase payment behavior to good, while −ye slope against any attribute decrease the payment behavior. As an example, for good category customers, an equation can be $$25=2.5*(air)+3*(\text{Normal order})-3*(\text{professional services})$$

As slopes of "air" and "normal order are positive and increase the property of good payment behavior of the customers. The "professional services" slope is negative and decreases the property of customer good behavior in payment.

Continuing in reference to FIG. 3, learning architecture 216 includes layer 4, recurrent neural network prediction to customer risk profile and payment date 318, which further processes factors (inputs, features and attributes) from layer 3, intersection between payment rules engine and segmentation 316.

For certain embodiments, in determining coefficients a, b ... n at layer 2, multivariate linear regression on payment factors 314, linear relationship between "X" and "Y" may not be accurate in predicting payment days for new invoices. Layer 4, recurrent neural network prediction to customer risk profile and payment date 318 provides for a recurrent neural network prediction to further refine payment tracking operation and analysis.

Figure 7:
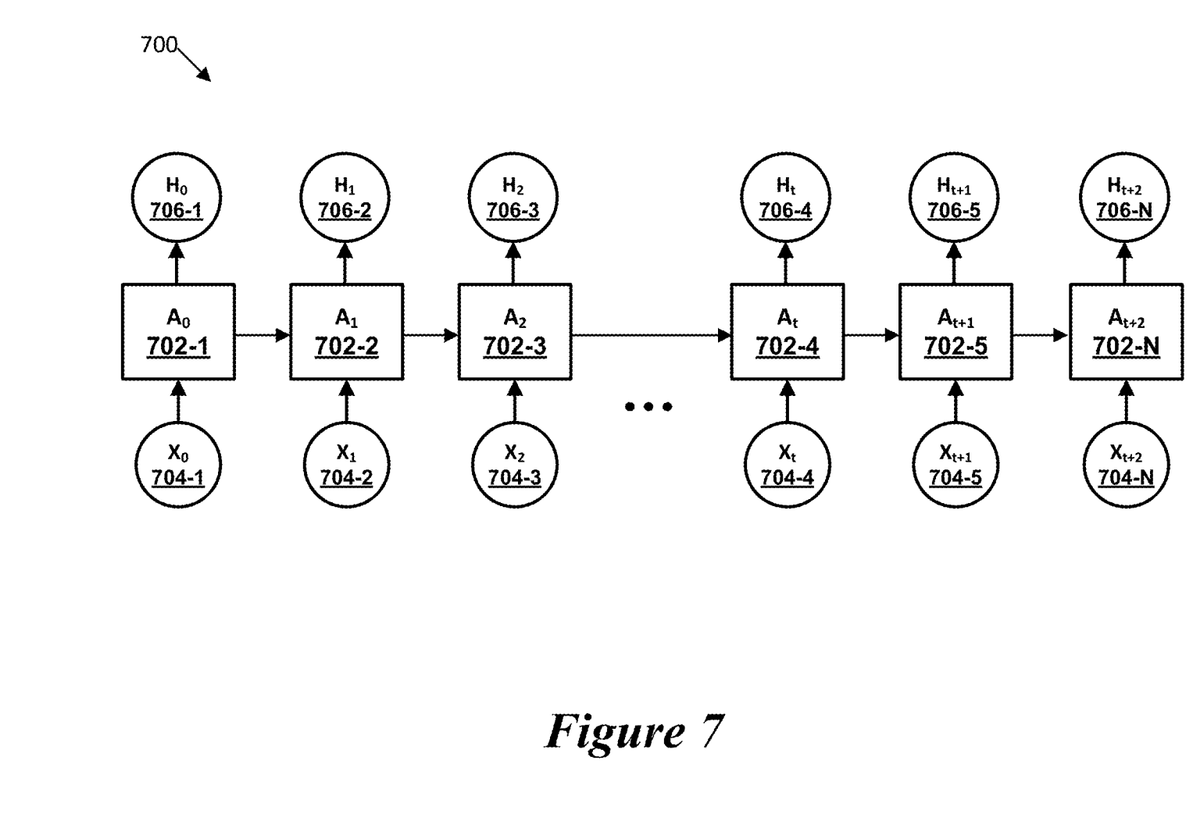
FIG. 7 is a block diagram of a recurrent neural network.

Referring to FIG. 7, a recurrent neural network (RNN) 700 is shown. RNN 700 includes a series of networks A 702 which are connected to each other in successive order. The RNN 700 begins with network $A_0$ 702-1 and progresses to $A_{t+2}$ 702-N. Each network A 702 receives and input x 704, and provides a predicted output H 706. For certain implementations, a network A 702 can receive predicted output H 706 from a predecessor network A. Therefore, predicted output H 706 becomes more refine and accurate as the RNN 700 is processed. Predicted output H 706 is an expected number of days for which the customer is to pay.

Figure 8:
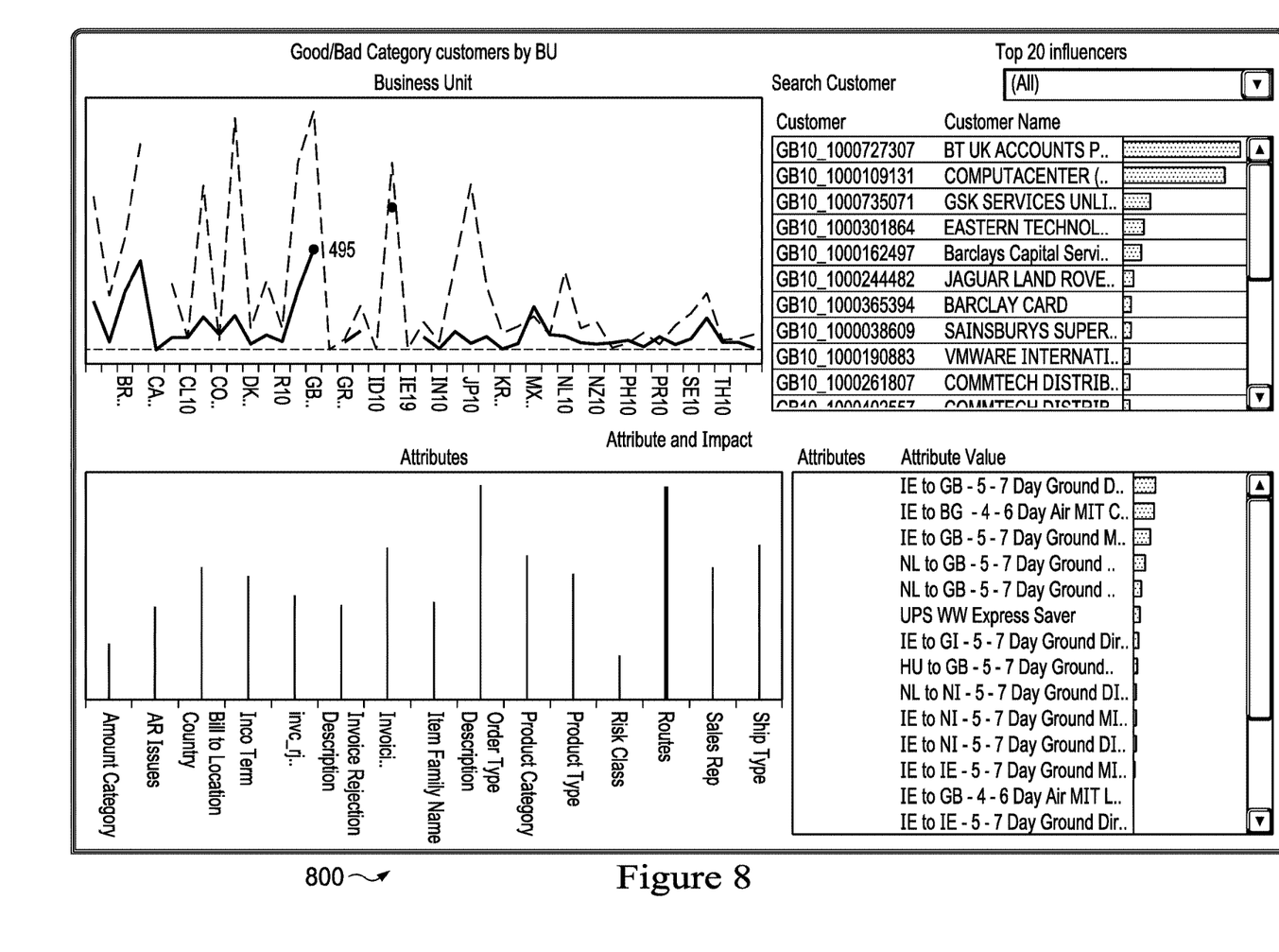
FIG. 8 is a screen presentation of a payment tracking payment tracking user interface.

Referring to FIG. 8, an example screen presentation of a payment tracking user interface 800 is shown. In particular, user interface 800 is a report screen showing in business unit wise number of good/bad payment behavior customers, top 20 influencers (factors), attributes impact, and respective values slope.

Figure 9:
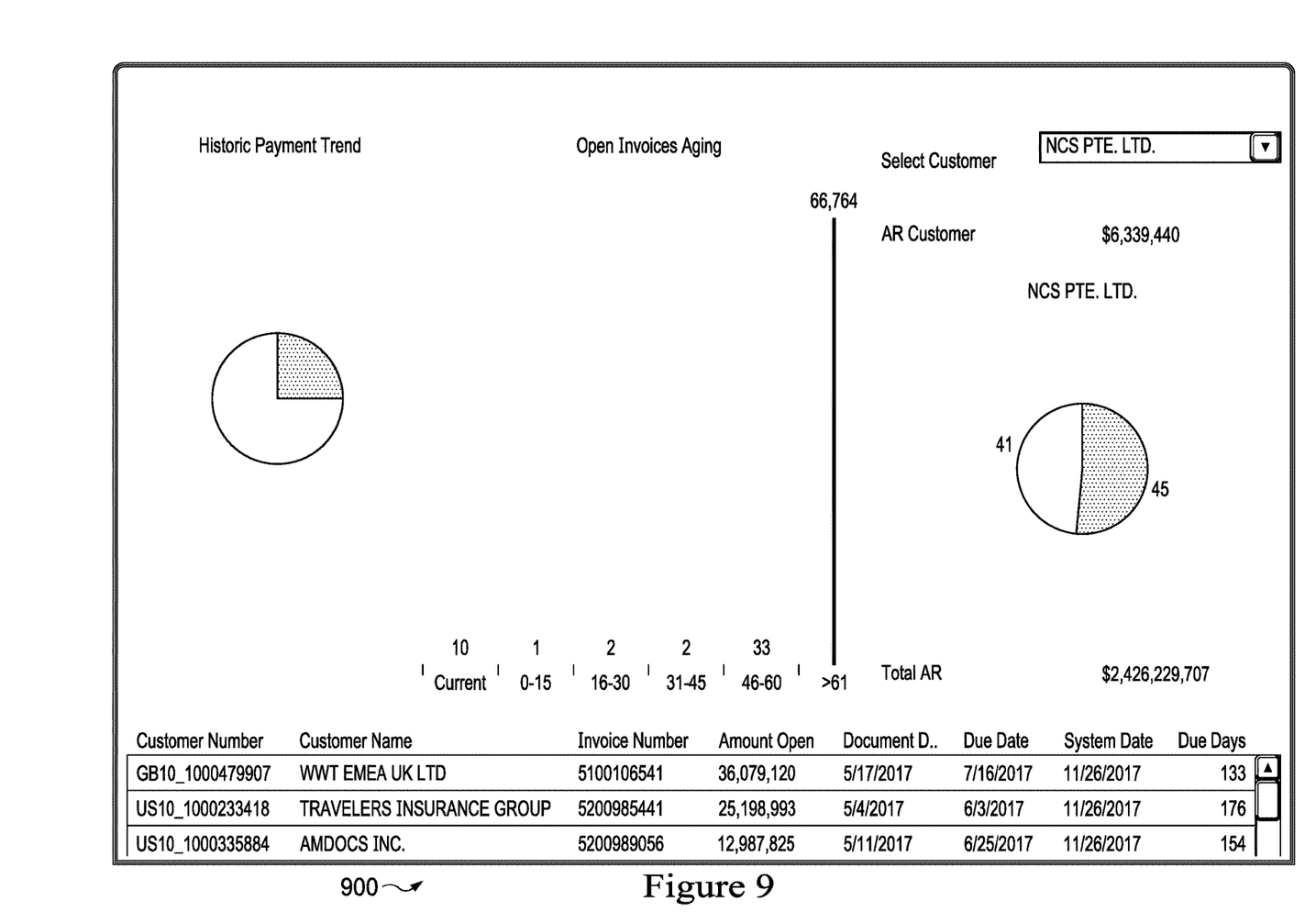
FIG. 9 is a screen presentation of a payment tracking payment tracking user interface.

Referring to FIG. 9, an example screen presentation of a payment tracking user interface 900 is shown. In particular, user interface 900 shows payment behavior changing over a period of time for specific customer.

Figure 10:
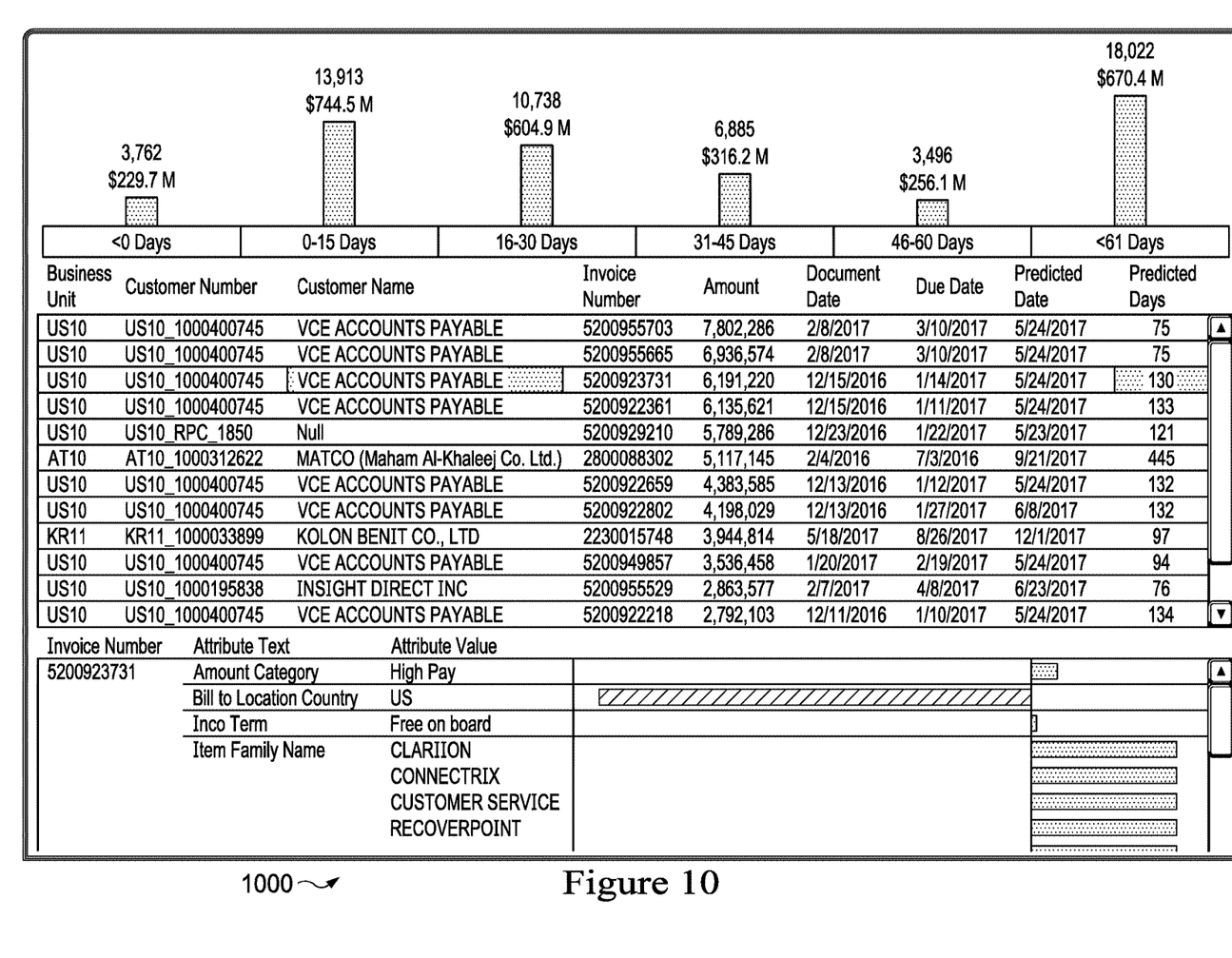
FIG. 10 is a screen presentation of a payment tracking payment tracking user interface.

Referring to FIG. 10, an example screen presentation of a payment tracking user interface 1000 is shown. In particular, user interface 1000 shows expected payment dates for the open invoices and impacting factors.

Figure 11:
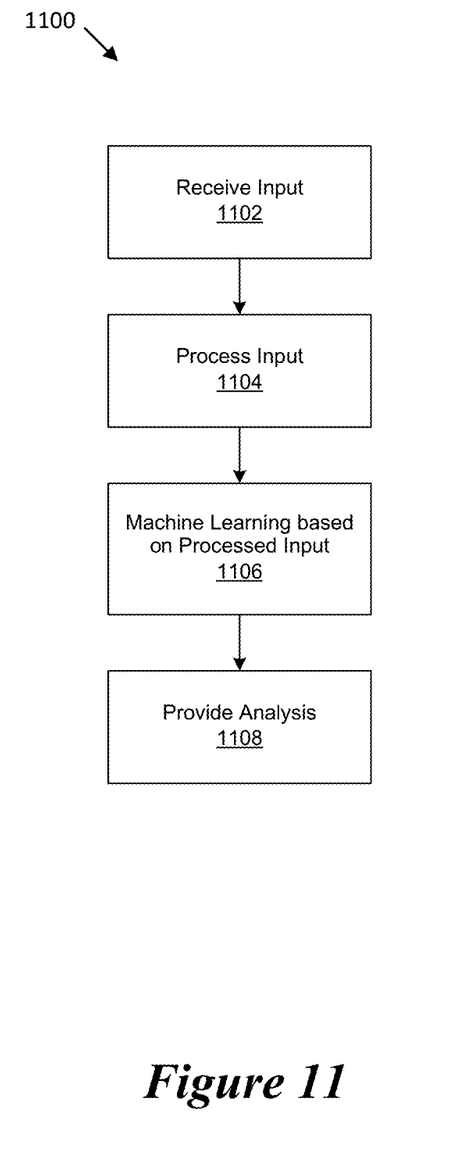
FIG. 11 is a generalized flowchart 1100 for payment tracking.

FIG. 11 is a generalized flowchart 1100 of the performance of operations implemented in accordance with an embodiment of the invention for payment tracking. In this embodiment, at step 1102, input is received, such as factors that include inputs, features and attributes, related to customers. The input can be from various sources, including internal company/business databases/repositories. At step 1104, the input is processed. For certain embodiments, the processing includes imputing and converting input. At step 1106, machine learning is performed on the processed input. For machine learning, several succeeding layers can be performed, including random forest customer segmentation, multivariate linear regression, determining intersection of payment rules and segmentation, and recurrent neural network. At step, an output is provided as to payment tracking operation analysis.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for improved payment tracking, comprising:
   receiving, by a processor of an information handling system, factors related to customers at a machine learning architecture of a payment tracking system executed by the processor, wherein factors comprise a document date and customer details;
   processing, by the processor, the factors to relevant input directed to payment tracking of the customers;
   determining, by the processor, payment influencer factors from the factors that affect payment by the customers by refining the factors, wherein the refining further includes processing the factors through multiple successive layers of the machine learning architecture comprising:
      classifying, through a first layer of the machine learning architecture, the customers to one or more customer classes by processing the factors through decision trees of a random forest architecture;
      determining a contribution of one or more values associated with each of the factors to a customer payment by processing the one or more values of the factors through multivariate linear regression;
      refining the factors from the first layer through a second layer of the machine learning architecture that implements the multivariate regression associated with the contribution of the one or more values of the factors;
      processing the factors from the second layer through a third layer of the machine learning architecture that determines the factors from the second layer that are associated with an intersection of the one or more customer classes and one or more payment rules;
      processing the factors from the third layer through a fourth layer of the machine learning architecture that includes a recurrent neural network that determines a customer payment risk profile and a predicted payment date associated with the customer payment risk profile; and
   outputting, by the processor, the payment influencer factors and the payment date.

2. The method of claim 1, wherein the factors comprise one or more of:
   invoice number;
   logistics data attributes;
   order number;
   item family name;
   item product type;
   document date;
   due date;
   clearing date;
   accounts receivable amount;
   bill location;

shipping type;
order type;
accounts receivable issues;
international commerce terms;
confirmation issues; and
rejection issues.

3. The method of claim 1, wherein the processing the factors to relevant input further includes imputing, deleting, and converting the factors.

4. The method of claim 1, wherein the multivariate linear regression provides that a positive slope increases favorability of factors related to customers and a negative slope decreases favorability of factors related to customers.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for improved payment tracking by a payment tracking system and comprising instructions executable by the processor and configured for:
  receiving multiple factors of different customers at a learning architecture, wherein the factors include variables that define the value of the factors, wherein the variables include a document date and customer details;
processing the multiple factors as to a relevance in payment tracking at the learning architecture;
performing machine learning at the learning architecture by processing the multiple factors in multiple successive layers that comprise:
  classifying, through a first layer of the learning architecture, the customers to one or more customer classes by processing the factors through decision trees of a random forest architecture;
  determining, through a second layer of the learning architecture, a contribution of one or more values associated with each of the factors to a customer payment by processing the one or more values of the factors through multivariate linear regression;
  processing the factors through a third layer of the learning architecture that determines the factors that are associated with an intersection of the one or more customer classes and one or more payment rules;
  processing the factors through a fourth layer of the learning architecture that includes a recurrent neural network that determines a customer risk profile and a predicted payment date associated with the customer risk profile; and
outputting the payment influencer factors and the payment date.

6. The system of claim 5, wherein the multiple factors comprise one or more of:
invoice number;
logistics data attributes;
order number;
item family name;
item product type;
document date;
due date;
clearing date;
accounts receivable amount;
bill location;
shipping type;
order type;
accounts receivable issues;
international commerce terms;
confirmation issues; and
rejection issues.

7. The system of claim 5, wherein the processing the multiple factors as to a relevance in payment tracking includes imputing, deleting, and converting the factors.

8. The system of claim 5, wherein the multivariate linear regression provides that a positive slope increases favorability of factors related to customers and a negative slope decreases favorability of factors related to customers.

9. The system of claim 5, wherein the multiple factors are received from one or more databases or repositories that include: customer billing, customer accounts receivable, and customer files.

10. A non-transitory, computer-readable storage medium embodying computer program code, the computer program code comprising computer executable instructions configured for:
receiving, by a processor of an information handling system, factors related to customers at a machine learning architecture of a payment tracking system executed by the processor, wherein factors comprise a document date and customer details;
processing, by the processor, the factors to relevant input directed to payment tracking of the customers;
determining, by the processor, payment influencer factors from the factors that affect payment by the customers by refining the factors, wherein the refining further includes processing the factors through multiple successive layers of the machine learning architecture comprising:
  classifying, through a first layer of the machine learning architecture, the customers to one or more customer classes by processing the factors through decision trees of a random forest architecture;
  determining a contribution of one or more values associated with each of the factors to a customer payment by processing the one or more values of the factors through multivariate linear regression;
  refining the factors from the first layer through a second layer of the machine learning architecture that implements the multivariate regression associated with the contribution of the one or more values of the factors;
  processing the factors from the second layer through a third layer of the machine learning architecture that determines the factors from the second layer that are associated with an intersection of the one or more customer classes and one or more payment rules;
  processing the factors from the third layer through a fourth layer of the machine learning architecture that includes a recurrent neural network that determines a customer payment risk profile and a predicted payment date associated with the customer payment risk profile; and
outputting, by the processor, the payment influencer factors and the payment date.

11. The non-transitory, computer-readable storage medium of claim 10, wherein the factors are received from or more databases that include: customer billing, customer accounts receivable, and customer files.

12. The non-transitory, computer-readable storage medium of claim 10, wherein factors include one or more of the set of:
invoice number;
logistics data attributes;

order number;
item family name;
item product type;
document date;
due date;
clearing date;
accounts receivable amount;
bill location;
shipping type
order type;
accounts receivable issues;
international commerce terms;
confirmation issues; and
rejection issues.

13. The non-transitory, computer-readable storage medium of claim 10, wherein processing the multiple factors include imputing, deleting, and converting the factors.

14. The non-transitory, computer-readable storage medium of claim 10, wherein machine learning architecture further comprises multivariate linear regression of the factors; determining intersection between payment rules and customer segmentation; and recurrent neural network processing to predict the customer risk profile and the payment date.

15. The non-transitory, computer-readable storage medium of claim 10 further comprising providing recommendations as to which of the factors to change to improve payment times.

16. The non-transitory, computer-readable storage medium of claim 10, wherein the multivariate linear regression provides that a positive slope increases favorability of factors related to customers and a negative slope decreases favorability of factors related to customers.

* * * * *